United States Patent [19]

Nakanishi et al.

[11] 4,296,720
[45] Oct. 27, 1981

[54] COMBUSTION CHAMBER OF AN INTERNAL COMBUSTION ENGINE

[75] Inventors: Kiyoshi Nakanishi; Takeshi Okumura; Ryuichi Deguchi, all of Susono; Toshio Tanahashi, Toyota, all of Japan

[73] Assignee: Toyota Jidosha Kogyo Kabushiki Kaisha, Toyota, Japan

[21] Appl. No.: 43,670

[22] Filed: May 30, 1979

[30] Foreign Application Priority Data

Jul. 20, 1978 [JP] Japan .................................. 53-87662

[51] Int. Cl.³ ........................ F02B 23/08; F02P 15/08
[52] U.S. Cl. .................................... 123/309; 123/638; 123/661
[58] Field of Search .............. 123/30 C, 30 D, 191 R, 123/191 M, 191 S, 193 R, 193 H, 193 CH, 193 CP, 148 C, 148 DS, 306, 307, 309, 657, 661, 636, 638, 640

[56] References Cited

U.S. PATENT DOCUMENTS

| | | | |
|---|---|---|---|
| 2,843,103 | 7/1958 | Wyczalek | 123/191 R |
| 3,154,061 | 10/1964 | Henry-Biabaud | 123/191 M |
| 3,776,212 | 12/1973 | Karlowitz | 123/30 D |
| 3,809,042 | 5/1974 | Hosho et al. | 123/148 DS |
| 4,162,661 | 7/1979 | Nakanishi et al. | 123/193 P |
| 4,182,279 | 1/1980 | Sato et al. | 123/191 S |

FOREIGN PATENT DOCUMENTS

| | | | |
|---|---|---|---|
| 2704721 | 8/1977 | Fed. Rep. of Germany | 123/148 C |
| 1287765 | 9/1972 | United Kingdom | 123/191 M |

Primary Examiner—Craig R. Feinberg
Attorney, Agent, or Firm—Stevens, Davis, Miller & Mosher

[57] ABSTRACT

An internal combustion engine comprising a first raised portion formed on the inner wall of the cylinder head, a second raised portion formed on the top face of the piston at a position opposite to the first raised portion with respect to the axis of the piston, and a third raised portion formed on the inner wall of the cylinder head above the second raised portion. A first flat squish area is formed between the flat peripheral top face of the piston and flat bottom face of the first raised portion. A second spherical shell shaped squish area is formed between the spherical bottom wall of the third raised portion and the spherical rear face of the second raised portion. A pair of spark plugs is arranged on the top face of the combustion chamber. One of the spark plugs is arranged in the vicinity of said first raised portion, and the other spark plug is arranged in the vicinity of said third raised portion.

12 Claims, 4 Drawing Figures

COMBUSTION CHAMBER OF AN INTERNAL COMBUSTION ENGINE

DESCRIPTION OF THE INVENTION

The present invention relates to a construction of the combustion chamber of an internal combustion engine.

As a method of simultaneously reducing the amount of harmful HC, CO and $NO_x$ components in the exhaust gas, a method of using a lean air-fuel mixture has been used. In addition, as a method of reducing the amount of harmful $NO_x$ components in the exhaust gas, a method of using a mixture containing the recirculated exhaust gas therein has been used. However, either when a lean air-fuel mixture is used or when a mixture containing the recirculated exhaust gas therein is used, a problem occurs in that, since the flame speed of either mixture is very low and the burning velocity is thus low, a stable combustion cannot be obtained. In order to obtain a stable combustion by using a lean air-fuel mixture or a mixture containing the recirculated exhaust gas therein, it is necessary to increase the burning velocity. As of increasing the burning velocity, a method creation of a strong turbulence in the combustion chamber can be used. As an engine which is capable of increasing the burning velocity by creating a turbulence in the combustion chamber, the inventor has proposed an engine which comprises a first downwardly projecting raised portion formed on the periphery of the inner wall of the cylinder head and having a flat bottom face so as to form a first squish area between the flat bottom face of the first raised portion and a flat peripheral portion of the top face of the piston when the piston approaches the top dead center. In addition, this engine further comprises a second upwardly projecting raised portion formed on the top face of the piston at a position opposite to the flat peripheral portion of the top face of the piston with respect to the axis of the cylinder so as to form a second squish area between the inner wall of the cylinder head and the rear face of the second raised portion when the piston approaches the top dead center. In addition, in this engine, the second raised portion has an inclined front face which is exposed to the combustion chamber and smoothly connected to the flat peripheral portion of the piston. At the end of the compression stroke, a swirl motion rotating about the horizontal axis is created in the combustion chamber by the pair of squish flows spouted from the first and the second squish areas, respectively, in the combustion chamber.

In the above-mentioned engine, since a swirl motion rotating about the horizontal axis is created in the combustion chamber, it is true that the burning velocity can be increased as compared with that in a conventional engine. However, in the above-mentioned engine, a satisfactorily high burning velocity cannot be obtained and, thus, it is necessary to obtain a more stable combustion and improve the specific fuel consumption by further increasing the burning velocity.

An object of the present invention is to provide an internal combustion engine capable of considerably increasing the burning velocity by creating a considerably strong swirl motion in the combustion chamber and by arranging a pair of ignition sources in the combustion chamber at positions spaced from each other.

According to the present invention, there is provided an internal combustion engine comprising: a cylinder block having a cylinder bore therein; a cylinder head mounted on the cylinder block and having an inner wall; a first raised portion having on its lower end a flat bottom face and being formed on the periphery of the inner wall of the cylinder head so as to project downwards; a piston reciprocally movable in the cylinder bore and having a top face which has a flat peripheral portion approachable to the flat bottom face so as to create a first squish area therebetween at the end of the compression stroke for spouting out a first squish flow along the top face of the piston, the inner wall of the cylinder head and the top face of the piston defining a combustion chamber therebetween; an intake valve movably mounted on the cylinder head for guiding a combustible mixture into the combustion chamber; an exhaust valve movably mounted on the cylinder head for discharging exhaust gas into the atmosphere, and; a second raised portion formed on the top face of the piston at a position opposite to the first raised portion with respect to an axis of the piston and having a rear face and a front face exposed to the combustion chamber, the rear face being approachable to the inner wall of the cylinder head so as to create a second squish area therebetween at the end of the compression stroke for spouting out a second squish flow which moves forwards in the upper interior of the combustion chamber in the direction opposite to the spouting direction of the first squish flow, the first and second squish flows cooperating with each other to create a strong swirl motion rotating about a horizontal axis in the combustion chamber, wherein the improvement comprises a third raised portion formed on the inner wall of the cylinder head above the second raised portion and having a bottom wall which cooperates with the rear face of the second raised portion for creating the second squish area therebetween, and a pair of spark plug arranged in the combustion chamber at positions spaced from each other.

The present invention may be more fully understood from the description of a preferred embodiment of the invention set forth below, together with the accompanying drawings.

DESCRIPTION OF A PREFERRED EMBODIMENT

Figure 1:
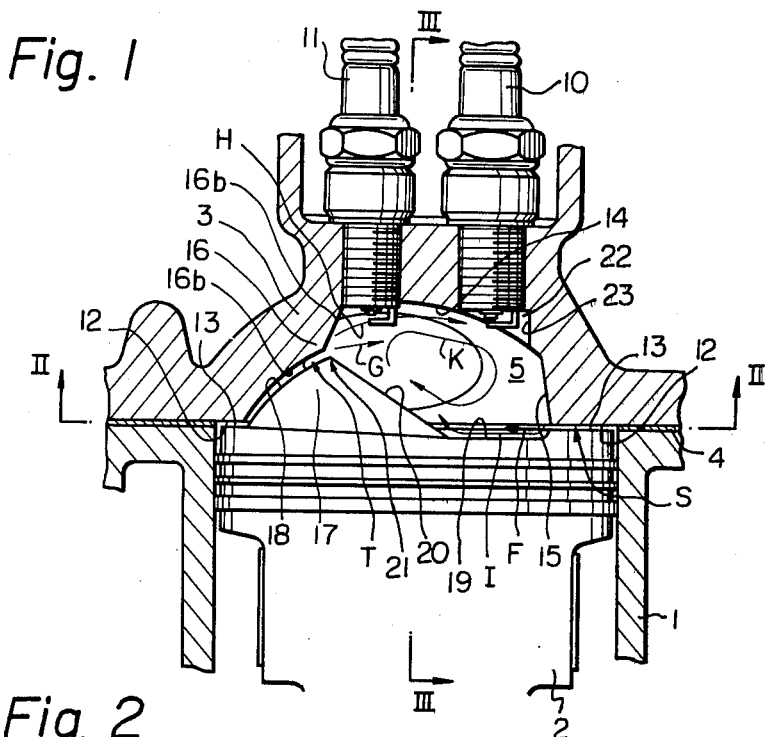
FIG. 1 is a cross-sectional side view of an internal combustion engine according to the present invention.
Figure 2:
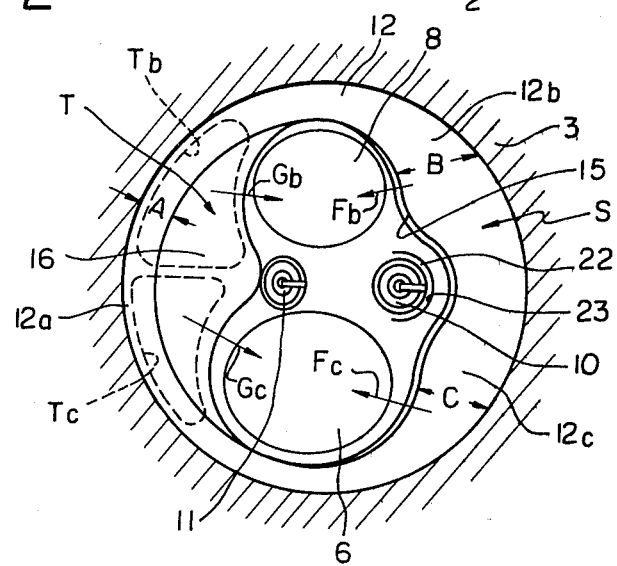
FIG. 2 is a bottom view taken along the line II—II in FIG. 1.
Figure 3:
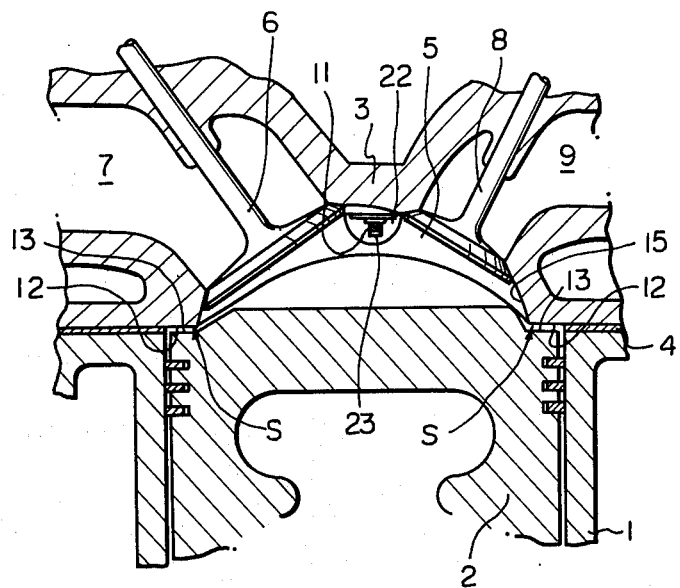
FIG. 3 is a cross-sectional side view taken along the line III—III in FIG. 1.
Figure 4:
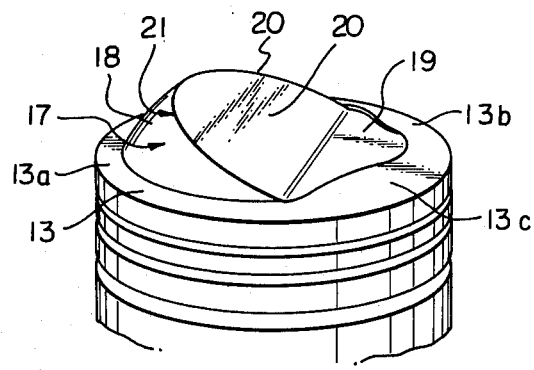
FIG. 4 is a perspective view of the piston illustrated in FIG. 1.

Referring to FIGS. 1 through 3, 1 designates a cylinder block, 2 a piston reciprocally movable in the cylinder block 1, 3 a cylinder head fixed onto the cylinder block 1 via a gasket 4 and 5 a combustion chamber formed between the top face of the piston 2 and the inner wall of the cylinder head 3. 6 designates an intake valve, 7 an intake port, 8 an exhaust valve, 9 an exhaust port, and 10 and 11 spark plugs. As is illustrated in FIGS. 1 through 3, the inner wall of the cylinder head 3 has an annular flat surface 12 which extends circumferentially over the entire periphery of the inner wall of the cylinder head. The flat surface portion 12a of the annular flat surface 12, which is located on the left side in FIG. 2, has a uniform width illustrated by the arrow A in FIG. 2, while flat surface portions 12b and 12c of the annular flat surface 12, which are located on the right side in FIG. 2, have widths which are wider than the width A of the flat surface portion 12a as illustrated by the arrows B and C in FIG. 2, respectively. In addition, from FIG. 2, it will be understood that the flat surface portion 12b located near the exhaust valve 8 has width B which is wider than width C of the flat surface portion 12c located near the intake valve 6. As is illustrated in FIGS. 1, 3 and 4, an annular flat surface 13 arranged to face the annular flat surface 12 of the cylinder head 3 and having a shape which is approximately equal to that of the annular flat surface 12 is formed on the top face of the piston 2. That is, the flat surface portion 13a of the annular flat surface 13, which is formed on the top face of the piston 2 so as to face the flat surface portion 12a of the cylinder head 3, has a uniform width which is approximately equal to the width A of the annular flat surface 12, and the flat surface portions 13b and 13c of the annular flat surface 13, which are formed on the top face of the piston 2 so as to face the flat surface portions 12b and 12c, respectively, have widths which are wider than the width of the flat surface portion 13a of the piston 2. Consequently, when the piston 2 is positioned at the top dead center as illustrated in FIG. 1, a flat and annular squish area S is formed between the annular flat surface 12 of the cylinder head 3 and the annular flat surface 13 of the piston 2. As illustrated in FIGS. 1 and 3, the top face 14 of the combustion chamber 5 has a spherical shape; in addition, the side wall 15 of the combustion chamber 5 extends approximately vertically from the flat surface portions 12b, 12c of the cylinder head 3 to the top face 14 of the combustion chamber 5. A downwardly projecting raised portion 16 is formed on the top face 14 at a position opposite to the spark plug 10 with respect to the axis of the piston 2, and the bottom wall 16a of the raised portion 16 has a spherical shape. The lower edge of the bottom wall 16a of the raised portion 16 is connected to the flat surface portion 12a of the cylinder head 3, and the upper edge of the bottom wall 16a is connected to the top face 14 of the combustion chamber 5 via a steeply inclined side wall 16b arranged to be exposed to the combustion chamber 5. As illustrated in FIG. 1, the electrode of the spark plug 11 is arranged on the top face 14 of the combustion chamber 5 at a position near the steeply inclined side wall 16b of the raised portion 16. A raised portion 17 is formed on the top face of the piston 2 at a position opposite to the flat surface portions 13b, 13c of the piston with respect to the axis of the piston 2, and the rear face 18 of the raised portion 17 has a spherical shape complementary to the shape of the bottom wall 16a of the raised portion 16. In addition, the lower edge of the rear face 18 of the raised portion 17 is connected to the flat surface portion 13a of the piston 2. Consequently, when the piston 2 is positioned at the top dead center as illustrated in FIG. 1, a spherical shell shape squish area T is formed between the bottom wall 16a of the raised portion 16 and the rear face 18 of the raised portion 17. In addition, a flat and shallow depression 19 is formed in the central portion of the top face of the piston 2 at a position located inside of the flat surface portions 13b, 13c of the piston 2, and the raised portion 17 has an inclined front face 20 extending from the flat depression 19 to a ridge 21 of the raised portion 17 and arranged to be exposed to the combustion chamber 5. As is illustrated in FIG. 1, the ridge 21 of the raised portion 17 is rounded. As can be seen in FIGS. 2 and 4, the first annular squish area extends inwardly from the periphery of the top face of the piston to a continuous, sinuous inner periphery which extends around and is almost vertically under the intake valve 6, exhaust valve 8, and spark plug recess 22. The first squish area is adjacent to the second raised portion 17. Recess 22 extends outwardly beyond a straight line extending between the peripheries of the intake valve 6 and exhaust valve 8. As is illustrated in FIGS. 1 through 3, a semi-cylindrical recess 22, which has a particular shape wherein the lower end of the semi-cylinder is obliquely cut, is formed on the top face 14 of the combustion chamber 5 at a position opposite to the squish area T with respect to the axis of the piston 2, and the electrode of the spark plug 10 is arranged in the recess 22. Consequently, the electrode of the spark plug 10 is partially enclosed by a vertically extending semi-cylindrical wall 23. As mentioned hereinafter, when the piston 2 approaches the top dead center, a pair of squish flows shown by the arrows F and G in FIG. 1 is spouted from the squish areas S and T, respectively, and the electrode of the spark plug 10 is arranged on an extension of the squish area T so that the squish flow G impinges directly upon the electrode of the spark plug 10. However, it should be noted that, when the downward movement of the piston 2 is started, a pair of gas streams flowing towards the squish areas S and T in directions which are opposite to those of the squish flows G and F, respectively, is created in the combustion chamber 5.

During operation, at the time of the intake stroke, when the downward movement of the piston 2 is started, the pair of gas streams flowing towards the squish areas S and T at a high speed in directions which are opposite to those of the squish flows G and F, respectively, is created in the combustion chamber 5 due to the temporary pressure drop within the squish areas S and T, and a strong turbulence is thus created in the combustion chamber 5. As a result of this, the air-fuel ratio of a lean mixture or a mixture containing the recirculated exhaust gas therein in the combustion chamber 5 becomes uniform over the entire region of the combustion chamber 5. When the mixture contains recirculated exhaust gas, the air-fuel mixture is completely mixed with the recirculated exhaust gas due to the above-mentioned strong turbulence. After this, at the time of the compression stroke, when the piston 2 approaches the top dead center, the squish flows F and G are spouted from the squish areas S and T, respectively. The squish flow F spouted from the squish area S flows towards the front face 20 of the raised portion 17, and the squish flow G spouted from the squish area T moves forward towards the recess 22. Then, the squish flow G impinges upon the semi-cylindrical wall 23, and a microturbulence is thus created in the recess 22. On the other hand, the squish flow F flowing towards the front face 20 of the raised portion 17 from the squish area 5 moves forward along the front face 20 of the raised portion 17 and then comes into violent contact with the squish flow G spouted from the squish area T. As a result of this violent contact, the flow direction of the squish flow G is changed so that the squish flow G flows along the top face 14 of the combustion chamber 5 as illustrated by the arrow H in FIG. 1. At this time, since the flow direction of the squish flow F is changed by the steeply inclined side wall 16b of the raised portion 16, the squish flow F also flows along the top face 14 of the combustion chamber 5 as illustrated by the arrow H in FIG. 1. By forming the steeply inclined side wall 16b which extends upwards from the ridge 21 of the raised portion 17, the squish flow G is not considerably decelerated by the squish flow F, and the squish flow F itself is also not considerably decelerated. Then, the squish flow H flowing along the top face 14 of the combustion chamber 5 passes in front of the recess 22 and moves downwards along the vertical side wall 15. At this time, since the electrode 11 of the spark plug 10 is arranged within the recess 22, the squish flow H does not impinge directly upon the electrode 11 of the spark plug 10. Then, the squish flow H flowing downwardly along the vertical side wall 15 comes into violent contact with the squish flow F spouted from the squish area S; as a result, the flow direction of the squish flow F is changed as illustrated by the arrow I in FIG. 1. At this time, the squish flow G also flows along the flat bottom of the depression 19 as illustrated by the arrow I in FIG. 1. By forming the depression 19 in the top face of the piston 2, the squish flow F is not considerably decelerated by the squish flow H, and the squish flow F is also not considerably decelerated. Thus, a strong swirl motion, shown by the arrow K, rotating about the horizontal axis is created in the combustion chamber 5.

Then, the mixture is ignited by the spark plugs 10 and 11 at the same time. At this time, since a microturbulence is created in the recess 22 as mentioned previously, the mixture is easily ignited and then the flame rapidly spreads within the recess 22. On the other hand, as mentioned previously, the flow direction of the squish flow G spouted from the squish area T is changed by the squish flow F and, as a result, the squish flow G is caused to flow along the steeply inclined side wall 16b of the raised portion 16. At this time, a strong turbulence is created on the top face 14 of the combustion chamber 5 at a position near the steeply inclined side wall 16b by the squish flows G and F. As a result, the mixture is easily ignited by the spark plug 11. When the spark plug 11 is so arranged that the electrode thereof projects into the combustion chamber 5 to a great extent, since the squish flow G impinges directly upon the electrode of the spark plug 11, there is a danger that the flame formed on the electrode of the spark plug 11 will be extinguished. Consequently, it is preferable that the electrode of the spark plug 11 be arranged at a position as close as possible to the steeply inclined side wall 16b and the top face 14. In the case wherein the flame formed on the electrode of the spark plug 11 is extinguished even if the electrode of the spark plug 11 is arranged at a position close to the steeply inclined side wall 16b and the top face 14, it is necessary to form a recess on the top face 14 of the combustion chamber 5 and position the electrode of the spark plug 11 within that recess.

The flames formed around the spark plugs 10 and 11, which are arranged to be spaced from each other, swirl in the combustion chamber 5 together with the strong swirl motion K and the burning velocity is thus considerably increased. In addition, since the flame swirls in the combustion chamber 5, unburnt HC and CO located in the quench layers formed on the inner wall of the cylinder head 3 and on the top face of the piston 2 are burned. After this, when the downward movement of the piston 2 is started, the unburnt gas in the combustion chamber 5 is sucked into the squish areas S and T together with the flame. As a result, the unburnt HC and CO located in the quench layers formed on the inner wall of the cylinder head 3 and on the top face of the piston 2 within the squish areas S and T are burned. As is illustrated in FIG. 1, in the present invention, the spark plug 11 is arranged in the vicinity of the squish area T. Consequently, when the downward movement of the piston 2 is started, since the flame formed around the spark plug 11 is sucked into the squish area T together with the unburnt HC and CO, the unburnt HC and CO sucked into the squish area T is immediately burned and, as a result, the burning velocity is considerably increased. However, in the case wherein the flame formed around the spark plug 11 is sucked into the squish area T as mentioned above, there is a danger that, when the engine is operating under a heavy load, the selfignition of the unburnt gas located at the peripheral end of the squish area T will be caused and, as a result, knocking will occur. Therefore, in order to prevent knocking from occurring, it is preferable that the igniting operation of the spark plug 11 remain stopped when the engine is operating under a heavy load.

In an internal combustion engine having such a construction that a swirl motion is created in the combustion chamber by the squish flow, the strength of the squish flow has a great influence on the strength of the swirl motion. In addition, the surface area of the squish area has a great influence on the strength of the squish flow. However, it is impossible to increase the surface area of the squish flow to a great extent in view of the construction of an engine. In addition, in the case wherein an excessively strong swirl motion is created in the combustion chamber, there is a danger in that a misfire will occur. As a result of experiments conducted by the inventor, in the engine illustrated in FIGS. 1 through 4, it has been proven that, in order to obtain an ease of ignition and a good combustion, it is preferable that a surface area ratio of the sum of the squish area formed on the inner wall of the cylinder head 3 and the squish area formed on the top face of the piston 2 to the sum of the cross-sectional area of the cylinder bore and the surface area of the inner wall of the cylinder head 3, except for the surface area of the vertical side wall 15, be in the range of 30 percent to 50 percent. In addition, it has also been proven that the best ignition and combustion can be obtained when the above-mentioned surface area ratio is in the range of 35 percent to 40 percent. In the present invention, in order to form squish areas S and T having a large surface area while forming the combustion chamber 5 as compact as possible, the squish area S must be so formed that it has an annular shape.

In addition, as mentioned previously, since the flat surface portion 12b of the cylinder head 3 has the width B which is wider than the width C of the flat surface portion 12c of the cylinder head 3, the squish flow spouted from the flat surface portion 12b as illustrated by the arrow Fb in FIG. 2 is stronger than that spouted from the flat surface portion 12c as illustrated by the arrow Fc in FIG. 2. In addition, as is illustrated by the broken lines Tb, Tc in FIG. 2, the squish area T is so formed that the surface area of the squish area portion Tb located near the exhaust valve 8 is considerably greater than that of the squish area portion Tc located near the intake valve 6; as a result, the squish flow Gb spouted from the squish area portion Tb is stronger than the squish flow Gc spouted from the squish area portion Tc. Consequently, a swirl motion which rotates about the horizontal axis and which is created in the combustion chamber 5 beneath the exhaust valve 8 by the pair of squish flows Fb, Gb becomes stronger than a swirl motion which rotates about the horizontal axis and which is created in the combustion chamber 5 beneath the intake valve 6 by the pair of squish flows Fc, Gc. As is known to those skilled in the art, knocking occurs due to the fact that the self-ignition of the mixture located near the exhaust valve 8 is caused. However, by creating a strong swirl motion in the combustion chamber 5 beneath the exhaust valve 8 and causing the flame of the mixture ignited by the spark plug 10 to propagate immediately towards the space around the exhaust valve 8, it is possible to prevent knocking from occurring.

According to the present invention, since an optimum and strong swirl motion can be created in the combustion chamber and, in addition, a pair of ignition sources is arranged so as to be spaced from each other in the combustion chamber, the burning velocity can be considerably increased. As a result, a stable combustion can be obtained, and the specific fuel consumption can be improved.

While the invention has been described with reference to a specific embodiment chosen for purposes of illustration, it should be apparent that numerous modifications can be made thereto by those skilled in the art without departing from the spirit and scope of the invention.

What is claimed is:

1. An internal combustion engine comprising:
a cylinder block having a cylinder bore therein;
a cylinder head having an inner wall mounted on said cylinder block;
a first raised portion formed on the periphery of the inner wall of said cylinder head, having a flat bottom face and projecting downwardly;
a piston reciprocally movable in said cylinder bore and having a top face with a flat peripheral portion approachable to said flat bottom face, creating a first squish area therebetween at the end of the compression stroke for spouting out a first squish flow along the top face of said piston, said first squish area comprising an annular area between the flat peripheral portion of the top face of the piston and the flat bottom face of the cylinder head, said first squish area extending substantially along the entire periphery of the top face of said piston;
a combustion chamber defined by the inner wall of the cylinder head and the top face of said piston;
an intake valve movably mounted on said cylinder head in fluid communication with said combustion chamber;
an exhaust valve movably mounted on said cylinder head in fluid communication with said combustion chamber;
a second raised portion formed on the top face of said piston at a position opposite to said first raised portion with respect to an axis of said piston, having a rear face and a front face exposed to said combustion chamber, said rear face being approachable to the inner wall of said cylinder head so as to create a second squish area therebetween at the end of compression stroke for spouting out a second squish flow which moves forward in the upper interior of said combustion chamber in a direction opposite to the spouting direction of said first squish flow, said first and second squish flows cooperating with each other to create a strong swirl motion rotating about a horizontal axis in said combustion chamber;
a third raised portion formed on the inner wall of said cylinder head above said second raised portion having a bottom wall which cooperates with said rear face of said second raised portion for creating said second squish area; and
a pair of spark plugs located in said combustion chamber, comprising a first spark plug located near said first raised portion in a recess formed on the inner wall of said combustion chamber, said recess being located on an extension of said second squish area and extending outwardly beyond a straight line extending between the peripheries of said intake and exhaust valves, and a second spark plug located near said third raised portion, said first squish area extending inwardly from the periphery of the top face of the piston to a continuous, sinuous inner periphery which extends around and is almost vertically under the intake valve, the exhaust valve, and said spark plug recess and adjacent to said second raised portion, the surface area ratio of the sum of the first and second squish areas formed on the inner wall of the cylinder head and the first and second squish areas formed on the top face of the piston to the sum of the cross-sectional area of the cylinder bore and the surface area of the inner wall of the cylinder head, excluding the surface area of the vertical side wall of said first raised portion, is in the range of from 30 to 50 percent.

2. An internal combustion engine as claimed in claim 1, wherein said recess has a vertically extending semi-cylindrical wall arranged on said extension of said second squish area.

3. An internal combustion engine as claimed in claim 1, wherein said combustion chamber has a spherical top face, said recess being formed on said spherical top face.

4. An internal combustion engine as claimed in claim 1, wherein said second spark plug has a spark gap arranged above the extension plane of said second squish area.

5. An internal combustion engine as claimed in claim 1, wherein said surface area ratio is in the range of 35 percent to 40 percent.

6. An internal combustion engine as claimed in claim 1, wherein the surface area of said first and second squish areas located near said exhaust valve is larger than that of said first and second squish areas located near said intake valve.

7. An internal combustion engine as claimed in claim 1, wherein said bottom wall of said third raised portion has a spherical shape, said rear face of said second raised portion having a shape which is complementary to the shape of said spherical bottom wall for creating a spherical shell shaped squish area between said rear face and said spherical bottom wall.

8. An internal combustion engine as claimed in claim 7, wherein said third raised portion has a steeply inclined side wall extending upwards from a ridge of said second raised portion.

9. An internal combustion engine as claimed in claim 1, wherein said first raised portion has a horizontally flat bottom face and an approximately vertical side wall exposed to said combustion chamber, said first squish area extending in a horizontal plane.

10. An internal combustion engine as claimed in claim 9, wherein a depression is formed on the top face of said piston and has an approximately vertical peripheral wall extending downwards from a lower edge of the vertical side wall of said first raised portion.

11. An internal combustion engine as claimed in claim 10, wherein the front face of said second raised portion is smoothly connected to a bottom wall of said depression.

12. An internal combustion engine as claimed in claim 11, wherein said front face of said second raised portion is formed so as to be flat.

* * * * *